United States Patent
Bacher et al.

(10) Patent No.: US 9,841,987 B2
(45) Date of Patent: *Dec. 12, 2017

(54) TRANSPARENT SECURE INTERCEPTION HANDLING

(71) Applicant: International Business Machines Corporation, Armonk, NY (US)

(72) Inventors: Utz Bacher, Dettenhausen (DE); Christian Borntraeger, Stuttgart (DE); Reinhard T. Buendgen, Tuebingen (DE); Dominik Dingel, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/220,736

(22) Filed: Jul. 27, 2016

(65) Prior Publication Data

US 2017/0177398 A1 Jun. 22, 2017

Related U.S. Application Data

(63) Continuation of application No. 14/972,280, filed on Dec. 17, 2015.

(51) Int. Cl.
*G06F 9/455* (2006.01)
*G06F 21/53* (2013.01)
(Continued)

(52) U.S. Cl.
CPC ........ *G06F 9/45558* (2013.01); *G06F 3/0635* (2013.01); *G06F 21/53* (2013.01);
(Continued)

(58) Field of Classification Search
None
See application file for complete search history.

(56) References Cited

U.S. PATENT DOCUMENTS

| 4,792,895 A | 12/1988 | Tallman |
| 5,371,867 A | 12/1994 | George et al. |

(Continued)

FOREIGN PATENT DOCUMENTS

| CN | 101179379 A | 5/2008 |
| CN | 101470783 A | 7/2009 |

(Continued)

OTHER PUBLICATIONS

IBM: List of IBM Patents or Patent Applications Treated as Related (Appendix P), Jul. 28, 2016, pp. 1-2.

(Continued)

*Primary Examiner* — Qing Wu
(74) *Attorney, Agent, or Firm* — Reza Sarbakhsh

(57) ABSTRACT

A method and system for transparent secure interception handling is provided. The method and system include deploying a virtual machine (VM) in an environment comprising a hypervisor and a firmware. The method and system include providing buffers in response to deploying the VM, and include executing VM instructions. The method and system include intercepting VM instructions which require access to instruction data and copying the VM state into a shadow VM state. Furthermore, the instruction data is copied to buffers, and the intercepted VM instruction is executed using the buffer. The method and system also include updating the shadow VM state buffer and the VM data in the VM memory using result data in the buffer in response to the executing of the intercepted VM instruction results. Furthermore execution of the VM instructions is resumed based on a state stored in the shadow VM state buffer.

14 Claims, 7 Drawing Sheets

(51) Int. Cl.
*G06F 3/06* (2006.01)
*G06F 21/60* (2013.01)

(52) U.S. Cl.
CPC ............ *G06F 21/60* (2013.01); *G06F 3/0629* (2013.01); *G06F 9/455* (2013.01); *G06F 9/45533* (2013.01); *G06F 2009/4557* (2013.01); *G06F 2009/45583* (2013.01)

(56) References Cited

U.S. PATENT DOCUMENTS

| | | | |
|---|---|---|---|
| 8,127,292 | B1 | 2/2012 | Dobrovolskiy et al. |
| 8,607,013 | B2 | 12/2013 | Chen et al. |
| 8,788,763 | B2 | 7/2014 | Arges et al. |
| 8,984,610 | B2 | 3/2015 | Spiers et al. |
| 2007/0011486 | A1 | 1/2007 | Li et al. |
| 2008/0178171 | A1 | 7/2008 | Sueyoshi et al. |
| 2009/0083736 | A1 | 3/2009 | Goto |
| 2009/0113110 | A1 | 4/2009 | Chen et al. |
| 2011/0072428 | A1 | 3/2011 | Day, II et al. |
| 2011/0179286 | A1 | 7/2011 | Spalka et al. |
| 2011/0302400 | A1 | 12/2011 | Maino et al. |
| 2011/0302415 | A1 | 12/2011 | Ahmad et al. |
| 2012/0216187 | A1 | 8/2012 | Ben-Yehuda et al. |
| 2014/0053272 | A1 | 2/2014 | Lukacs et al. |
| 2014/0096134 | A1 | 4/2014 | Barak et al. |
| 2014/0229943 | A1 | 8/2014 | Tian et al. |
| 2014/0373012 | A1 | 12/2014 | Ylitalo et al. |
| 2015/0334126 | A1 | 11/2015 | Mooring et al. |

FOREIGN PATENT DOCUMENTS

| | | |
|---|---|---|
| GB | 2515536 A | 12/2014 |
| WO | 2014207581 A1 | 12/2014 |

OTHER PUBLICATIONS

Bacher et al., Pending U.S. Appl. No. 14/972,280, filed Dec. 17, 2015, titled "Transparent Secure Interception Handling,", pp. 1-39.

Tsifountidis, et al., "Virtualisation security: Virtual Machine monitoring and introspection," Royal Holloway Series 2011, University of London, 2011 (Best Date Available), pp. 1-15.

Boivie, "SecureBlue++: CPU Support for Secure Execution", IBM Research Report, RC25287 (WAT1205-070) May 23, 2012, pp. 1-9.

Riley et al., "Guest-Transparent Prevention of Kernel Rootkits with VMM-based Memory Shadowing", RAID 2008, pp. 1-20.

GB Pending Application No. DE920150111GB1, Filed on Dec. 8, 2016, Titled "Transparent Secure Interception Handling," Application No. 1620899.3, pp. 1-41.

Combined Search and Examination Report, GB, Application No. GB1620899.3, dated May 19, 2017, pp. 1-7.

Jin et al., "H-SVM: Hardware-Assisted Secure Virtual Machines under a Vulnerable Hypervisor", IEEE Transactions on Computers, vol. 64, No. 10, Oct. 2015, pp. 2833-2846.

Mell et al., "The NIST Definition of Cloud Computing," National Institute of Standards and Technology, U.S. Department of Commerce, Special Publication 800-145, Sep. 2011, pp. 1-7.

Riley et al., "Guest-Transparent Prevention of Kernel Rootkits with VMM-based Memory Shadowing", RAID 2008 (Best Date Available), pp. 1-20.

Szefer et al., "A Case for Hardware Protection of Guest VMs from Compromised Hypervisors in Cloud Computing", IEEE, Jul. 2011, pp. 1-5.

US 9,841,987 B2

TRANSPARENT SECURE INTERCEPTION HANDLING

BACKGROUND

The present invention relates to computer systems, and more specifically, to a method for transparent secure interception handling of data in networks.

One problem regarding public cloud environments is the unsecure access to data and algorithms e.g. by a cloud provider. As the cloud provider does not need such access to data in order to offer his service the cloud provider may be prevented from accessing such data. However, the access prevention has to be performed so that cloud providers would still be able to virtualize their hardware resources and offer them to multiple customers for efficiency reasons while at the same time customers could be ensured that no access to data or algorithms from the cloud provider is possible. Typically, cloud operators have privileged access to their hypervisor environments, which may rule out software-only solutions.

SUMMARY

Various embodiments provide a method for transparent secure interception handling, firmware, hypervisor, computer program product, and computer system as described by the subject matter of the independent claims. Advantageous embodiments are described in the dependent claims. Embodiments of the present invention can be freely combined with each other if they are not mutually exclusive.

In one aspect, the invention relates to a computer implemented method for transparent secure interception handling. The method comprises: deploying a virtual machine, VM, in an environment, the environment comprising a hypervisor running on a hardware and a firmware which manages the hardware and which manages states of the virtual machine, the virtual machine being configured to access a corresponding VM memory of the environment upon deploying the virtual machine providing buffers by the hypervisor to the firmware; executing VM instructions of the virtual machine; intercepting by the firmware a VM instruction of the VM instructions which requires access to instruction data, the instruction data comprising at least one of: VM data that is stored in the VM memory and at least part of the state of the virtual machine, VM state upon the intercepting of the VM instruction copying by the firmware the VM state into a shadow VM state buffer owned by the firmware; copying by the firmware the instruction data to the buffers; executing by the hypervisor the intercepted VM instruction using the buffers; before resuming execution of the VM instructions following the intercepted VM instruction updating at least one of the shadow VM state buffer and the VM data in VM memory using result data in the buffers in case the executing of the intercepted VM instruction results in the result data; and resuming execution of the VM instructions following the intercepted VM instruction based on the state stored in the shadow VM state buffer.

In another aspect, the invention relates to a computer system for transparent secure interception handling, the computer system comprising a hypervisor running on a hardware. The hypervisor is configured for deploying a virtual machine, VM, in the computer system, the virtual machine being configured to access a corresponding VM memory of the computer system upon deploying the virtual machine providing buffers by to the firmware; and executing VM instructions of the virtual machine.

The computer system further comprises a firmware which manages the hardware and which manages states of the virtual machine.

The firmware is configured for intercepting a VM instruction of the VM instructions which requires access to instruction data, the instruction data comprising at least one of: VM data that is stored in the VM memory and at least part of the state of the virtual machine, VM state; copying the VM state into a shadow VM state buffer owned by the firmware; and copying the instruction data to the buffers.

The hypervisor is configured for executing the intercepted VM instruction using the buffers; wherein the firmware is configured for: before resuming execution of the VM instructions following the intercepted VM instruction updating at least one of the shadow VM state buffer and the VM data in the VM memory using result data in the buffers in case the executing of the intercepted VM instruction results in the result data.

The firmware is configured for resuming execution of the VM instructions following the intercepted VM instruction based on the state stored in the shadow VM state buffer.

In another aspect, the invention relates to a firmware for transparent secure interception handling, the firmware managing the hardware and states of a virtual machine. The firmware is configured for intercepting a VM instruction of VM instructions of the VM which requires access to instruction data, the instruction data comprising at least one of: VM data that is stored in a VM memory and at least part of the state of the virtual machine, VM state; copying the VM state into a shadow VM state buffer owned by the firmware; copying the instruction data to buffers; before resuming execution of the VM instructions following the intercepted VM instruction updating at least one of the shadow VM state buffer and the VM data in the VM memory using results of execution of the intercepted VM instruction; resuming execution of the VM instructions following the intercepted VM instruction based on the state stored in the shadow VM state buffer.

In another aspect, the invention relates to a hypervisor for transparent secure interception handling. The hypervisor is configured for deploying a virtual machine, VM, in a computer system by configuring the virtual machine to access a corresponding VM memory of the computer system; upon deploying the virtual machine, providing buffers by to a firmware of the computer system; executing VM instructions of the virtual machine; executing an intercepted VM instruction of the VM instructions using the buffers; resuming execution of the VM instructions following the intercepted VM instruction based on the state stored in the shadow VM state buffer.

In another aspect, the invention relates to a computer program product for transparent secure interception handling, the computer program product comprising a computer readable storage medium having program instructions embodied therewith, the program instructions executable by a processor to deploy a virtual machine, VM, in an environment, the environment comprising a hypervisor running on a hardware and a firmware which manages the hardware and which manages states of the virtual machine, the virtual machine being configured to access a corresponding VM memory of the environment; upon deploying the virtual machine provide buffers to the firmware; execute VM instructions of the virtual machine; intercept a VM instruction of the VM instructions which requires access to instruction data, the instruction data comprising at least one of: VM data that is stored in the VM memory and at least part of the state of the virtual machine, VM state; upon the intercepting of the VM instruction copy the VM state into a shadow VM state buffer owned by the firmware; copy the instruction data to the buffers; execute the intercepted VM instruction using the buffers; before resuming execution of the VM instructions following the intercepted VM instruction update at least one of the shadow VM state buffer and the VM data in the VM memory using result data in the buffers in case the executing of the intercepted VM instruction results in the result data; and resume execution of the VM instructions following the intercepted VM instruction based on the state stored in the shadow VM state buffer.

The above features may have the advantage of a secure access to data in a virtual machine environment. This may particularly be advantageous for distributed systems that centrally manage the virtual machines and for which the user of virtual machines may have no control on the central management. For example, using the present method a cloud provider would still be able to virtualize hardware resources and offer them to multiple users for efficiency reasons while at the same time users could be ensured that no access to data or algorithms from the cloud provider is possible. This may work by preventing access to the VM state (memory as well as CPU) by the hypervisor (e.g. Intel SGX and Microsoft Haven, IBM SecureBlue++).

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
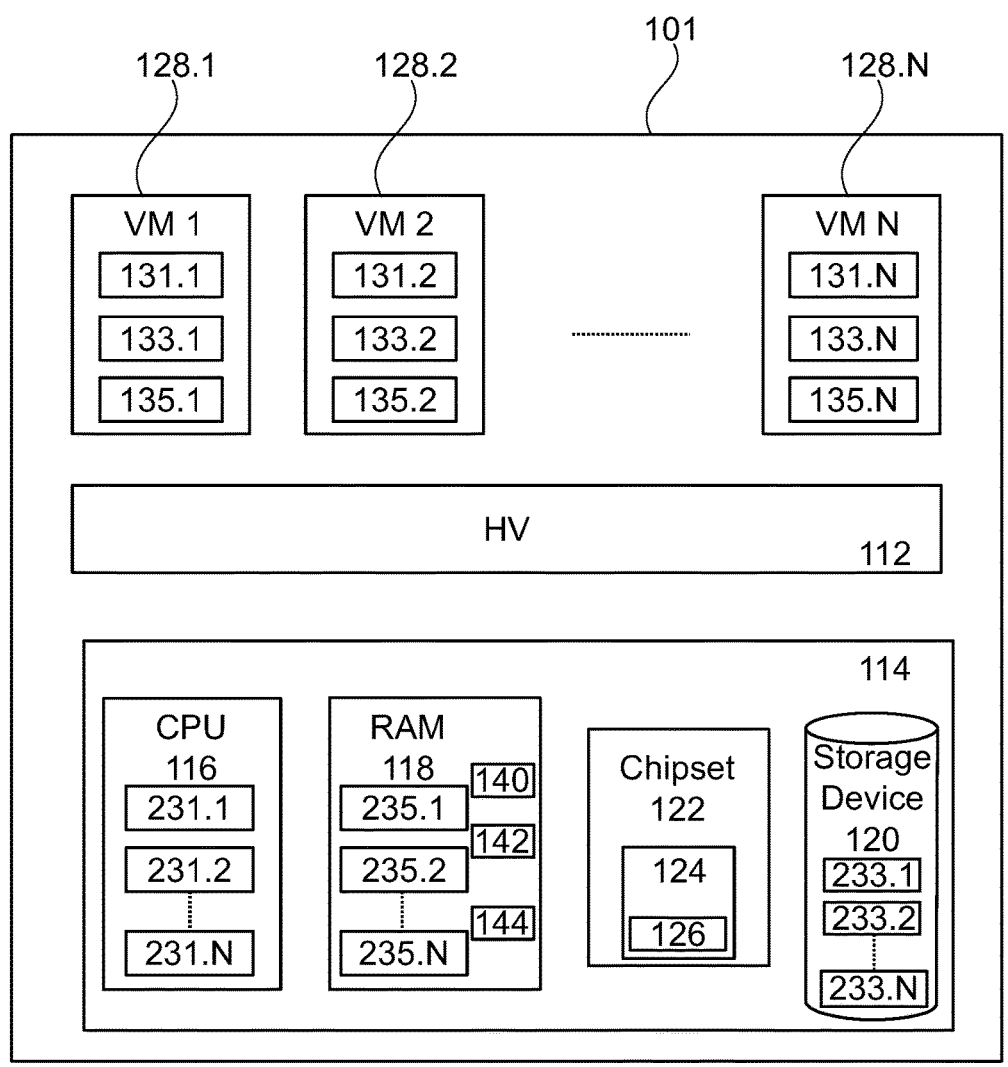
FIG. 1 depicts a block diagram of a computer system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method may enable existing hypervisors to perform VM intercept and interrupt handling when running on top of a firmware. In particular the layers of the hypervisor that manage intercept and interrupt handling of a VM may remain unmodified. Fulfilling this requirement may simplify the development effort for such a solution on the hypervisor side and thus enable the firmware technology to a wider spectrum of exploiters. The firmware may be responsible to manage hypervisor memory used by the current virtualization interface such that the confidentiality of the VM or virtual machine may be maintained.

The term "VM state" as used herein refers to a configuration and/or set of information and resources that occurs within a particular VM at a particular point in time.

The term "Virtual Machine (VM)" as used herein refers to a logical representation of a physical machine (computing device, processor, etc.) and its processing environment (operating system (OS), software resources, etc.) The VM is maintained as software that executes on an underlying host machine (physical processor or set of processors). From the perspective of a user or software resource, the VM appears to be its own independent physical machine.

The term "hypervisor or VM Monitor (VMM)" as used herein refers to a processing environment or platform service that manages and permits multiple VM's to execute using multiple (and sometimes different) OS's on a same host machine.

The term "hardware" as used herein refers to an element having a physical structure such as electronic, electromagnetic, optical, electro-optical, mechanical, electro-mechanical parts, etc.

The term "firmware" as used herein refers to a logical structure, a method, a procedure, a program, a routine, a process, an algorithm, a formula, or an expression that is implemented or embodied in a hardware structure (e.g., flash memory or read only memory). Examples of firmware are microcode, writable control store, and micro-programmed structure.

The term "buffer" or pool as used herein refers to a region of a physical memory storage used to temporarily store data while it is being moved from one place to another.

It must be appreciated that deploying a virtual machine includes an installation process of the virtual machine and an activation (or starting) process of the virtual machine. In another example, deploying a virtual machine includes an activation (or starting) process of the virtual machine e.g. in case the virtual machine is previously installed or already exists.

The intercepting of the VM instruction may be performed while the VM instructions are being executed, such that the execution may be interrupted and then resumed as described herein. The interruption is meant in the sense that the "normal" execution of the VM instructions is interrupted until the intercepted VM instruction is executed. For example, if the VM instructions comprise a succession of instructions inst1, inst2, inst 3 . . . instN and the inst4 is the intercepted instruction. Inst1-inst3 may be executed (e.g. using a first technique), then this execution is interrupted as inst4 would be executed in another way as explained herein and then the execution of instructions inst5-instN may be resumed after execution of inst4 in that the execution of inst5-instN would be performed as for the execution of inst1-inst3 using the first technique.

The above features may have the advantage of a secure access to data in a virtual machine environment. This may particularly be advantageous for distributed systems that centrally manage the virtual machines and for which the user of virtual machines may have no control on the central management. For example, using the present method a cloud provider would still be able to virtualize hardware resources and offer them to multiple users for efficiency reasons while at the same time users could be ensured that no access to data or algorithms from the cloud provider is possible. This may work by preventing access to the VM state (memory as well as CPU) by the hypervisor (e.g. Intel SGX and Microsoft Haven, IBM SecureBlue++).

According to one embodiment, the buffers comprises a VM state buffer and a memory pool, wherein copying the instruction data to the buffers comprises copying by the firmware the at least part of the VM state from the shadow VM state buffer to the VM state buffer; in case the instruction data comprises VM data that is stored in the VM memory copying by the firmware the VM data from the VM memory to the memory pool; and replacing by the firmware, in the VM state buffer, first addresses to data in the VM memory by corresponding second addresses in the memory pool. This embodiment may be seamlessly integrated in existing systems in a transparent manner, by redirecting access to data in the VM memory to other locations in the memory. This may prevent the change or configuration of the hypervisors of existing environments. This embodiment may prevent access to the VM memory by the hypervisor.

According to one embodiment, updating at least one of the shadow VM state buffer and the VM data in VM memory comprises in response to determining that the result data comprises processed VM data in the memory pool copying by the firmware at least part of the processed VM data from the memory pool to associated addresses of the first addresses; copying by the firmware at least part of the result data stored in the VM state buffer to the shadow VM state buffer; replacing by the firmware in the shadow VM state buffer addresses of the second addresses by corresponding addresses to data in the memory pool. This embodiment may provide a reliable method for executing the virtual machine. By copying processed data in the VM memory, the subsequent execution of the virtual machine instructions may use the right/correct data that has been produced by a previous instruction e.g. the intercepted VM instruction.

According to one embodiment, the at least part of the processed VM data comprises expected data determined by the firmware using the intercepted VM instruction and arguments of the intercepted VM instruction. This embodiment may prevent copying unnecessary data to the VM memory. For example, the hypervisor may produce extra data that is not related to the intercepted VM instruction. This extra data may not be copied in the VM memory.

According to one embodiment, the instruction data is determined by the firmware using the intercepted VM instruction and arguments of the intercepted VM instruction.

According to one embodiment, the method further comprises upon deploying the virtual machine preventing the hypervisor to access the VM memory. This may have the advantage of further enhancing the secure aspect of the present method by preventing malicious access to the VM memory. For example, although the hypervisor is redirected to read data from buffers, it may happen that a malicious access to the VM memory is implemented therein.

According to one embodiment, the method further comprises: filling by the firmware unused data locations in the memory pool and the buffer for the VM state with fake data. This may have the advantage of further enhancing the secure aspect of the present method, in that the hypervisor is only allowed to access copies of the VM memory in the memory pool of the deployed VM. Trying to access the unused data locations may result in reading fake data. This may prevent the crashing of the hypervisor.

According to one embodiment, the fake data comprises at least one of random data and zeros.

According to one embodiment, executing by the hypervisor the intercepted VM instruction further comprising requesting by the hypervisor to resume the execution of the VM instructions following the intercepted VM instruction. Upon completing the execution of the intercepted VM instruction, the firmware may have access to resulting data in the buffers that may be required for completing the execution of the VM instructions.

According to one embodiment, copying by the firmware the state of the virtual machine into the shadow VM state buffer owned by the firmware being performed upon setting up a virtual CPU, vCPU, for the virtual machine or upon executing the VM instructions on the vCPU. This embodiment may have the advantage of seamlessly integrating the present method in existing systems.

FIG. 1 shows a block diagram of a computer system 101. The computer system 101 may be part of a cloud computing environment. However, persons of ordinary skill in the art should appreciate that said computer system 101 may be integrated and may function in other distributed computing systems such as grid computing system and cluster computing systems and computing systems supporting virtualization software.

As shown by the figure, the computer system 101 may be managed by a hypervisor 112 (which may also be referred to as a virtual machine monitor). The hypervisor 112 may create one or more virtual machines 128.1-128.N. The hypervisor 128 may enable its virtual machines 128.1-128N to share physical resources 114 of the computer system 101. Physical resources 114 may perform processing of data or instructions, and may comprise one or more processors 116 that execute instructions, memory e.g. random access memory (RAM) 118 that stores information for processing, a storage device 120 such as a hard disk drive (HDD) electromechanical hard drive and solid state hard drive and a chipset 122 that includes firmware 124 to coordinate interactions between physical processing resources. One example of firmware 124 is a basic input/output system (BIOS) 126 that boots hypervisor 112 from an off state in storage of hard disk drive 120 to an on state in RAM 118 for execution by processor 116. In an operational state, hypervisor 112 executes using physical resources 114 to support operations of virtual machines 128. A number of programs may be comprised in storage device 120, and/or RAM 118, and executed by processor 116 including an operating system and/or application programs. It must be appreciated that the VM (Virtual machine) and its components span from 1 to N.

Components of the physical resources 114 may be interconnected by one or more system busses which couples various system components to processor 116. The system buses may be any of several types of bus structures including a memory bus or memory controller, a peripheral bus, and a local bus using any of a variety of bus architectures.

Each VM 128 comprises at least one virtual CPU 131, a virtual system memory or VM memory 135, a guest operating system, one or more applications running on the guest operating system and optionally at least one virtual disk 133. The components of the VM 128.1 may be implemented in software to emulate the corresponding components of a physical computer. For example, the virtual machine 128.1 comprises a virtual system memory 135.1 which may be implemented in software emulating the corresponding physical memory 235.1 of the RAM 118. The corresponding physical memory 235.1 of virtual system memory 135.1 may be referred to as "VM memory 235.1". The virtual CPU 131.1 of the virtual machine 128.1 is emulating the corresponding physical CPU 231.1 of the processor 116. The virtual disk 133.1 of the virtual machine 128.1 is emulating the corresponding physical disk 233.1 of the storage device 120, where 1 refers to a virtual machine and has values from 1 to N.

The RAM 118 may further comprise a shadow VM state buffer 140 that is owned by the firmware 124 e.g. only the firmware 124 may have access to the shadow VM state buffer 140 or the firmware 124 may control other component to access that shadow VM state buffer 140. The RAM 118 may further comprise buffers 142-144 that are provided as described below.

Figure 2:
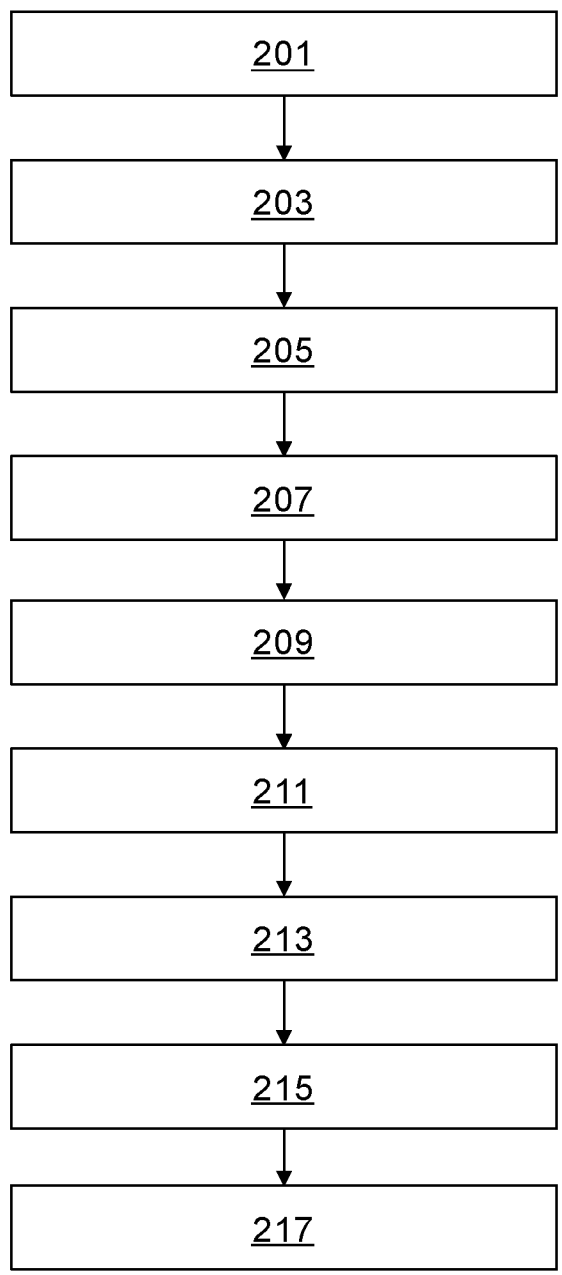
FIG. 2 is a flowchart of a method for transparent secure interception handling.

FIG. 2 is a flowchart of a method for transparent secure interception of one or more VM instructions handling. In step 201, a virtual machine e.g. VM1 128.1 may be deployed. For example, in an embodiment, the hypervisor 112 may deploy the virtual machine 128.1. The deploying of the VM 128.1 may automatically be performed e.g. on a periodic basis (every day). In another example, the deploying of the VM 128.1 may be performed in response to receiving by the hypervisor a request for deploying the VM 128.1.

The deploying of the VM 128.1 may for example comprise installing the VM 128.1 and starting the VM 128.1. In another example, the deploying of the VM 128.1 may comprise starting the VM 128.1 in case the VM 128.1 is already installed on computer system 101.

In step 203, upon deploying the virtual machine 128.1 the hypervisor 112 may provide buffers 142-144 to the firmware 124. For example, the buffers 142-144 may comprise one or more regions of memory or RAM 118. The buffers 142-144 may be used to temporarily store data while the data is being moved from one place to another. For example, in an embodiment, the buffers 142-144 may be deleted as soon as the VM 128.1 is closed or the execution of the VM 128.1 is ended.

The hypervisor 112 may send an instruction to the CPU 116 to allocate space in the RAM 118 for the buffers 142-144. The size of the buffers 142-144 may for example be randomly chosen. In another example, the size of the buffers 142-144 may be predefined e.g. using historical data collected from previous executions of the VM 128.1.

The buffers 142-144 may comprise for example a VM state buffer 142 and a memory pool (or memory buffer) 144.

In step 205, VM instructions of the VM 128.1 may be executed. The VM 128.1 may for example comprise a sequence of instructions forming the VM instructions. The VM instructions may be executed by the processor 116. The VM instructions may be fetched from the memory 118 in order to be executed.

In step 207, the firmware 124 may intercept a VM instruction of the VM instructions which requires access to instruction data. The instruction data comprises VM data that is stored in the VM memory 235.1 and/or at least part of the state of the VM 128.1 (VM state). The at least part of the state of the VM state may be the state that is required by the intercepted VM instruction in order to be executed. For example, the intercepted VM instruction may not require access to the entire VM state of the VM 128.1. The intercepted VM instruction may or may not require access to VM data that is stored in the VM memory 235.1 of the VM 128.1.

For example, in an embodiment, the intercepted VM instruction may comprise a privileged instruction. The privileged instruction may, for example, refer to a CPU instruction such as: I/O command, setting the clock command, clear memory command to create a storage protection directives.

For example, a VM instruction that comprises attempts to access processor control registers and tables may be intercepted by the firmware 124. The VM 128.1 may be running in user mode and may not be allowed to access these tables, as this would violate isolation constraints. When, for example, the VM 128.1 makes a call to a privileged instruction (one that truly requires being in the hypervisor mode), the firmware 124 intercepts this call or VM instruction, instead of the hypervisor.

In step 209, upon the intercept of the VM instruction, the firmware 124 may copy the VM state into the shadow VM state buffer 140. The VM state may comprise the VM execution state that may comprise the memory state, the virtual processor state, the virtual devices state, and/or the network connectivity state.

In step 211, the firmware 124 may copy the instruction data to the buffers 142-144. The buffers 142-144 may for example comprise only part of the VM state that is required by the intercepted VM instruction. The shadow VM state buffer 140 may for example comprise the whole VM state as copied in step 209.

In step 213, the hypervisor 112 may execute the intercepted VM instruction using the buffers 142-144. The execution of the intercepted VM instruction may or may not result in result data in the buffers 142-144. The hypervisor 112 may be prevented to access the VM memory 235.1 and may only have access to the buffers 142-144 in order to execute the intercepted VM instruction. This may be advantageous as the hypervisor 112 may include or execute instructions such as relative LOAD, STORE and ADD or other instructions that can unsafely try to access the VM memory 235.1.

The Execution of the intercepted VM instruction may introduce changes to at least part of the instruction data and/or may introduce new data in the buffers 142-144.

For example, upon executing the intercepted VM instruction, the hypervisor 112 may send an instruction to the firmware 124 to resume execution of the VM instructions following the intercepted VM instruction.

In step 215, before resuming execution of the VM instructions following the intercepted VM instruction at least one of the shadow VM state buffer 140 and the VM data in VM memory 235.1 may be updated using the result data. For example, the step 215 comprises updating the shadow VM state buffer 140 using the result data before resuming execution of the VM instructions following the intercepted VM instruction. In another example, step 215 comprises updating the VM state buffer 140 and the VM data in VM memory 235.1 using the result data before resuming execution of the VM instructions following the intercepted VM instruction. Since the buffers 142-144 have been used by the hypervisor 112 to execute the intercepted VM instruction, the content (result data) of the buffers 142-144 may be used by the firmware 124 in order to update the shadow VM state buffer 140 and the VM data in VM memory 235.1 in case the intercepted VM instruction requires access to the VM data. Step 215 may be performed in case the execution of the intercepted VM instruction results in the result data.

In step 217, the execution of the VM instructions following (in the sequence of instructions) the intercepted VM instruction may be performed based on the state stored in the shadow VM state buffer 140.

Figure 3:
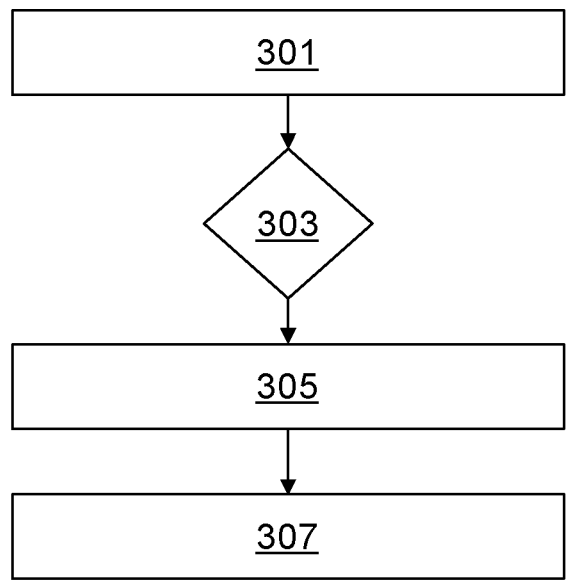
FIG. 3 is a flowchart of a method for copying the instruction data to buffers.

Referring to FIG. 3, a method for copying the instruction data to the buffers 142-144 is shown.

In step 301, the firmware 124 may copy at least part of the VM state from the shadow VM state buffer 140 (of the instruction data above) to the VM state buffer 142. In another example, at the time of executing step 209 (i.e. copying the VM state into the shadow VM state buffer 140) the copy of at least part of the VM state to the VM state buffer may be performed as well.

The firmware 124 may determine (inquiry 303) if the instruction data comprises VM data that is stored in the VM memory 235.1. If so, the firmware 124 may copy in step 305 the VM data from the VM memory 235.1 to the memory pool 144 and may replace in step 307 in the VM state buffer 142 first addresses to data in the VM memory 235.1 by corresponding second addresses in the memory pool 144. The first addresses refer to locations in the VM memory 235.1 that comprise the VM data. The second addresses refer to locations in the memory pool 144 that comprise the VM data.

Figure 4:
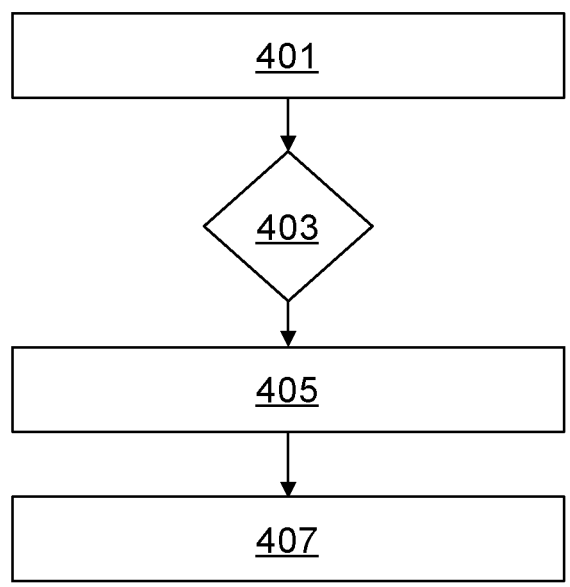
FIG. 4 is a flowchart of a method for updating at least one of a shadow VM state buffer and VM data in VM memory.

Referring to FIG. 4, a method for updating at least one of the shadow VM state buffer and the VM data in VM memory 235.1 is shown.

In step 401, the firmware 124 may copy at least part of the result data stored in the VM state buffer 142 to the shadow VM state buffer 140. For example, the result data may comprise state result data. The at least part of the VM state that is copied in the buffers in step 301 may be modified after execution of the intercepted VM instruction. The format of the results of that modification may be calculated by the firmware 124 by for example reading the intercepted VM instruction and the arguments of the intercepted VM instruction. The firmware may for example have a table of interceptable instructions which for each instruction and each instruction argument indicates a format and/or size of input and output data. By performing this calculation the firmware 124 may copy only part of the state result data that is in line with the calculation, e.g. ensure that a time-of-day value is only 8 bytes to avoid overriding data in the VM, or ensuring the time-of-day lies in a reasonable timeframe, avoiding attacks to applications in the VM against the year-2038 problem. For example, the state result data may comprise a first portion and a second portion. The first portion is expected to be part of the result data as calculated by the firmware 124. In this case, the first portion may be copied into the shadow VM state buffer 140.

The firmware 124 may determine (inquiry 403) if the result data comprises processed VM data in the memory pool 144. If so, the firmware 124 may copy in step 405 at least part of the processed VM data from the memory pool 144 to associated addresses of the first addresses. As with the state result data, the at least part of the processed VM data may comprise expected or calculated data areas by the firmware 124 and that is produced upon executing the intercepted VM instruction. The at least part of the processed VM data from the memory pool copied by the firmware 124 to the VM memory may contain addresses of locations in the memory pool 144. Any such address of locations in the memory pool may be replaced in the VM memory by an address to an associated location in the VM memory.

In step 407, the firmware 124 may replace in the shadow VM state buffer 140 addresses of the second addresses by corresponding addresses to data in the VM memory 235.1.

Figure 5A:
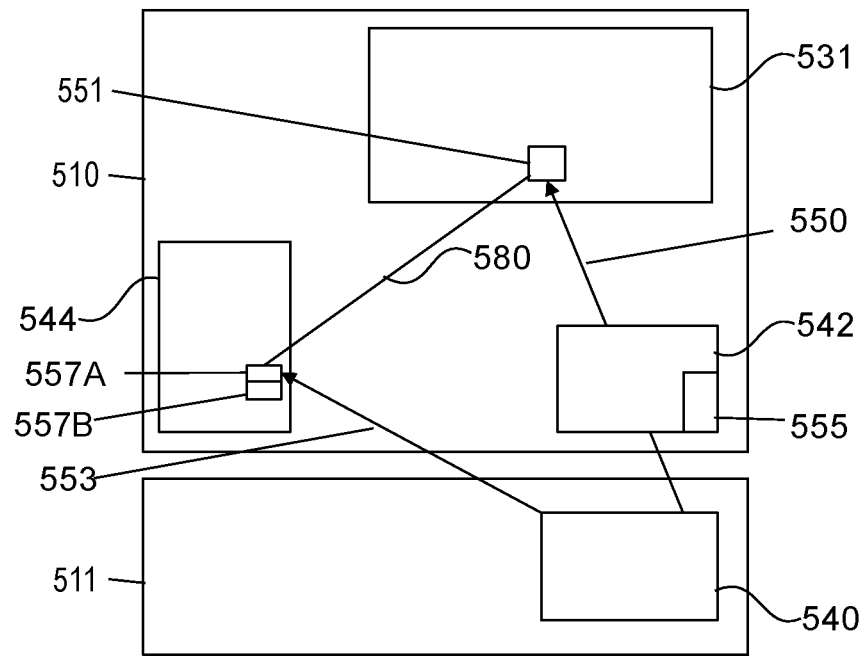
FIG. 5A is a block diagram which illustrates a memory structure in accordance with an exemplary method of the present disclosure.

FIGS. 5A and B illustrate a memory (e.g. 118) structure of a computer system e.g. 101 in accordance with an example method. The memory structure comprises hypervisor (HV) memory 510 and memory of trusted firmware 511 which in this embodiment is not accessible by HV.

In this embodiment, the computer system may comprise a z Systems platform. There is one instruction (Start Interpretive Execution) which does take a VM state describing data block (SIE-block 542) containing general purpose registers as well as specific virtualization configurations. When the hypervisor e.g. 112 issues the SIE instruction, the firmware 124 does steps necessary to setup a virtual CPU of the VM and starts/continues the execution. This will run until the virtualization will stop because the hypervisor 112 may be needed to emulate/virtualize a restricted resource or govern access to some resource. In such an event the firmware 124 may save the VM state as well as a reason code for that interception. The implementation might consist of a shadow SIE-block 540 (such as shadow VM state buffer 140 which indicates genuine guest (or VM) state as known by the firmware) in memory accessible to firmware 124 only and only copy data from and to the hypervisor SIE-block 542 (such as VM state buffer 142) as the current/last reason code would permit. Arrow 550 indicates that firmware 124 knows about VM memory.

As an example, the guest or VM e.g. 128.1 might issue an instruction to set a timer, with a value specified in a general purpose register. The firmware 124 might copy only that general purpose register and the reason code to the hypervisor SIE-block 542, so that the hypervisor 112 could setup a timer for that VM 128.1. All other fields within the hypervisor SIE-block 542 (e.g. 555) could be filled with random data or fake. Pool of proxy of pages 544 comprises a copy 557A-B of VM or guest pages partially filled with fake data. In the present embodiment 557A may represent fake and 557B may represent useful data. Furthermore line 580 represents, in this embodiment, that pages transferred and contained within the two boxes of 557A-B and guest page 551 are the same pages. Upon hypervisor 112 satisfying the VM request and continues by issuing another SIE instruction, the firmware 124 might copy data from the hypervisor SIE-block 542 (e.g. condition code success for setting the timer) back to firmware SIE-block 540 and issue the real SIE instruction.

The method described so far may work for all VM interceptions that do not require references to VM memory 531 (such as virtual system memory 135/guest memory not accessible by HV) locations. VM memory 531 is shown as comprising a guest page 551 with location referred to in guest state buffer. If in an intercept a VM memory location is referenced in a general purpose register (e.g. as in the z Systems instruction "store system information") the VM memory location as well as the content will be redirected to a pool of proxy pages 544 (such as memory pool 144) accessible to the hypervisor 112. Arrow 553 indicates that firmware 124 knows proxy pages.

Figure 5B:
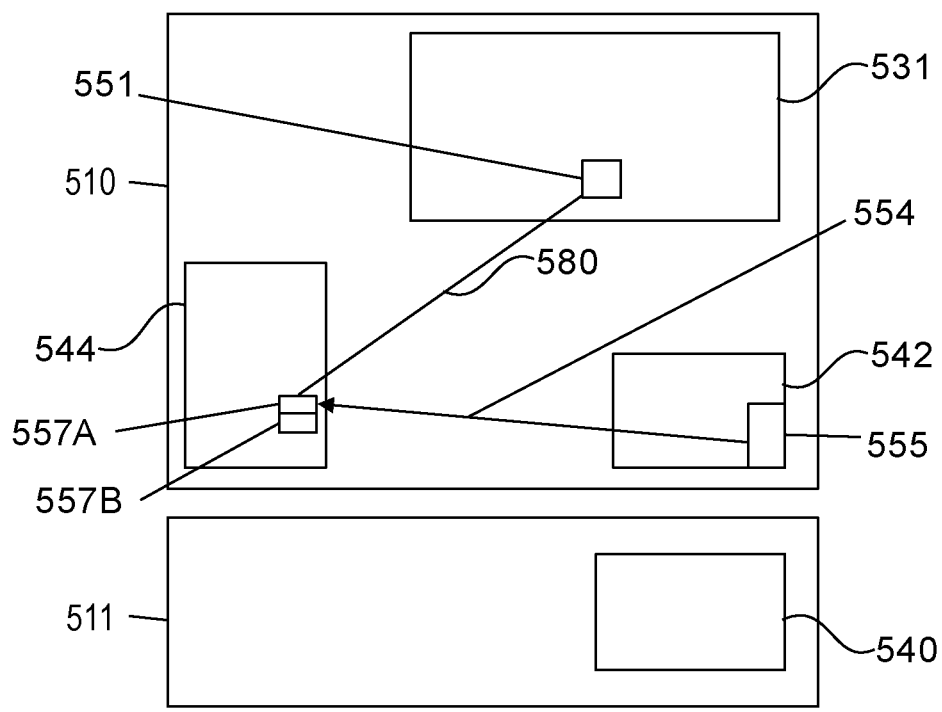
FIG. 5B is a block diagram which illustrates another memory structure in accordance with an exemplary method of the present disclosure.

While FIGS. 5A and 5B essentially depict the same process, it must also be appreciated that FIG. 5A's depiction focuses on a point of view of a firmware, and FIG. 5B's depiction focuses on a point of view of a hypervisor.

During the VM definition the hypervisor 112 may reserve a memory area to be used for proxy pages 544 associated with VM 128.1 and announce these pages as proxy pages to the firmware 124. In a case of an intercept the firmware 124 copies required data items from the VM memory 531 to the proxy pages 544 associated with the VM 128.1 and changes the reference in the general purpose register or the hypervisor SIE block 540 to locations in that proxy page, then the firmware 124 gives control to the hypervisor 112 with the reason code of the intercept. The hypervisor 112 may write information expected by the VM 128.1 to the referenced address in the proxy page 544 (e.g. arrow 554 indicates a reference to location HV accessible pool of proxy pages) and continues the VM 128.1 by issuing a SIE instruction. The firmware 124 then copies, if necessary, the data written by the hypervisor 112 from the proxy pages 544 back to the VM memory 531.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
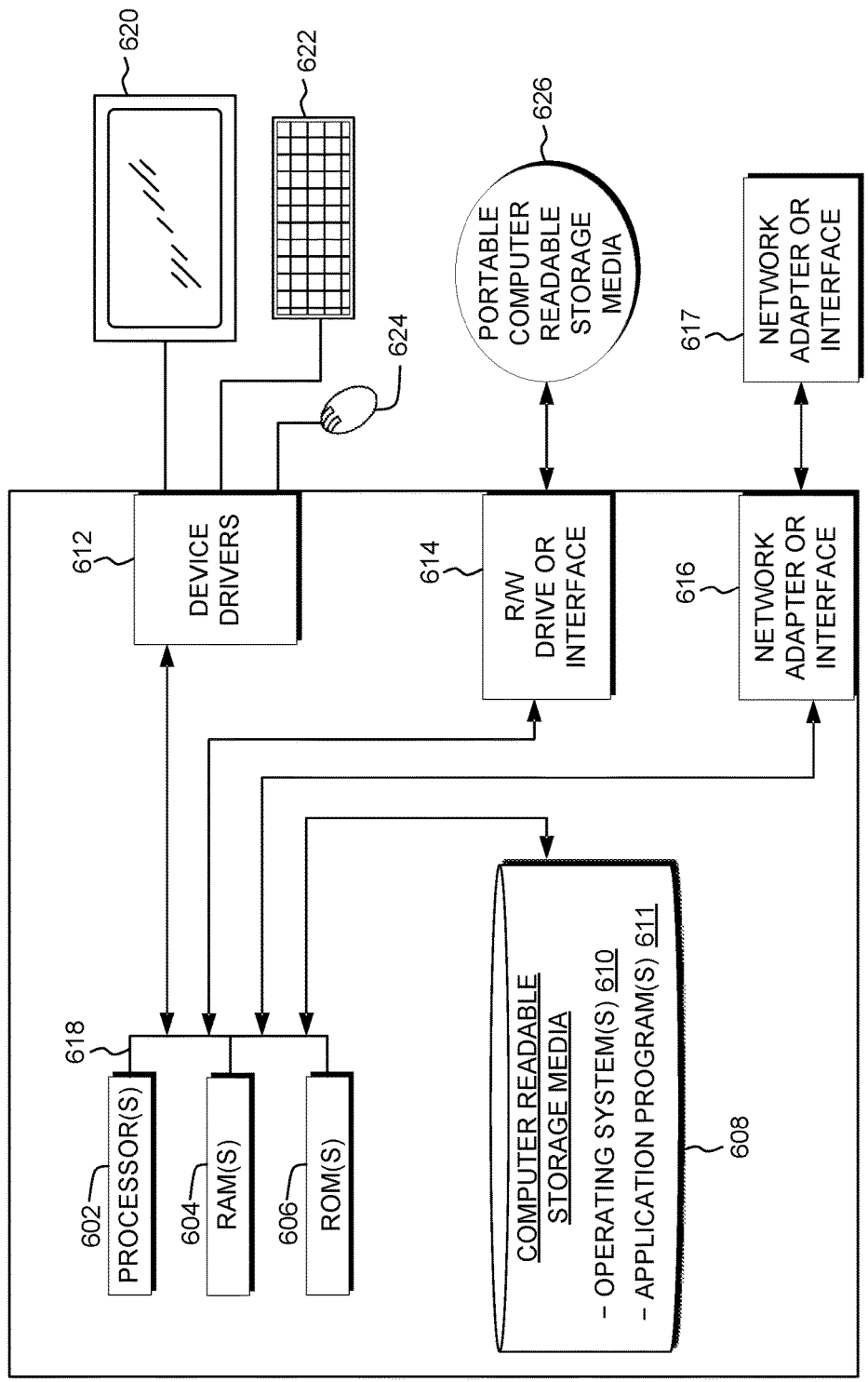
FIG. 6 is a block diagram of components of a computing environment, in accordance with embodiments of the present disclosure.

FIG. 6 depicts a block diagram of components of a computer environment, in accordance with an embodiment of the present disclosure. It should be appreciated that FIG. 6 provides only an illustration of one implementation and does not imply any limitations with regard to the environments in which different embodiments may be implemented. Many modifications to the depicted environment may be made.

Computing environment depicted in FIG. 6 may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs (such as application program 611) may be stored on one or more of the computer readable storage media 608 for execution by one or more of the processors 602 via one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing environment 600 may also include a R/W drive or interface 614 to read from and write to one or more portable computer readable storage media 626. Application programs may be stored on one or more of the portable computer readable storage media 626, read via the respective R/W drive or interface 614 and loaded into the respective computer readable storage media 608.

Computing environment depicted in FIG. 6 may also include a network adapter or interface 616, such as a TCP/IP adapter card or wireless communication adapter (such as a 4G wireless communication adapter using OFDMA technology) for connection to a network 617. Application programs may be downloaded to the computing device from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Computing environment depicted in FIG. 6 may also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

Figure 7:
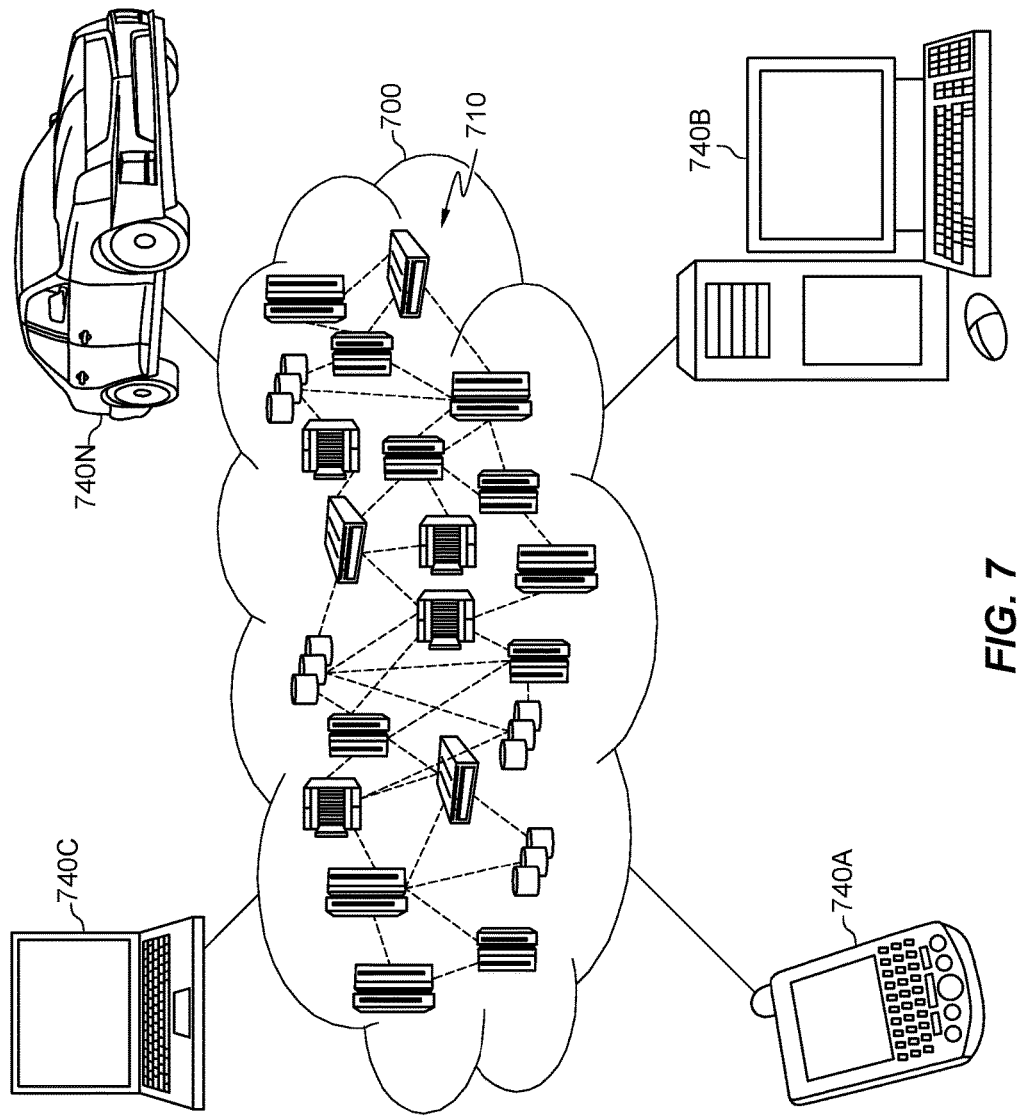
FIG. 7 depicts a cloud computing environment according to an embodiment of the present disclosure.

Referring now to FIG. 7, illustrative cloud computing environment 700 is depicted. As shown, cloud computing environment 700 comprises one or more cloud computing nodes 710 with which local computing devices used by cloud consumers, such as, for example, personal digital assistant (PDA) or cellular telephone 740A, desktop computer 740B, laptop computer 740C, and/or automobile computer system 740N may communicate. Computing nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 740A-N shown in FIG. 7 are intended to be illustrative only and that computing nodes 710 and cloud computing environment 700 can communicate with any type of computerized device over any type of network and/or network addressable connection (e.g., using a web browser).

Figure 8:
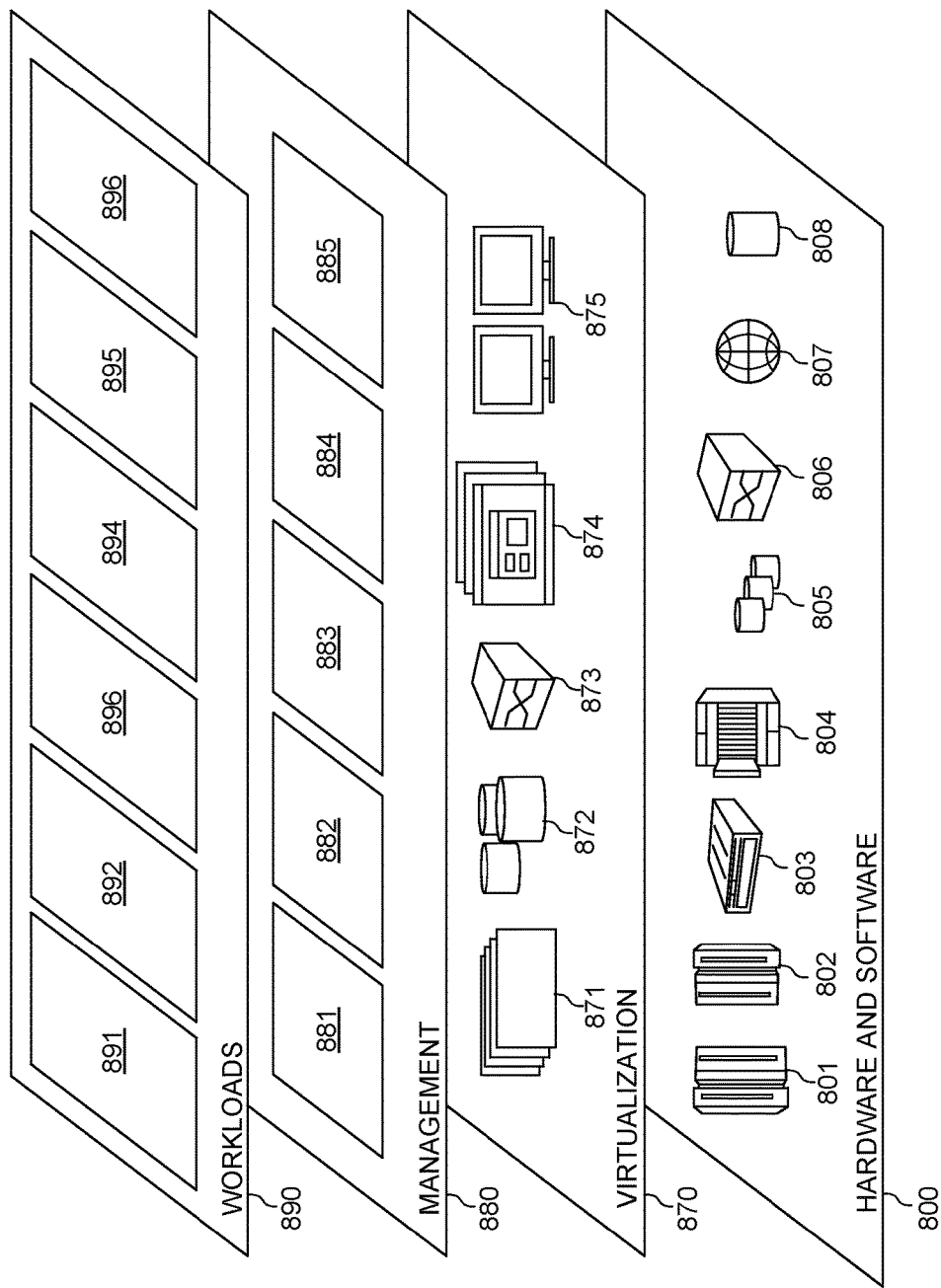
FIG. 8 depicts abstraction model layers according to an embodiment of the present disclosure.

Referring now to FIG. 8, a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 800 includes hardware and software components. Examples of hardware components include: mainframes 801; RISC (Reduced Instruction Set Computer) architecture based servers 802; servers 803; blade servers 804; storage devices 805; and networks and networking components 806. In some embodiments, software components include network application server software 807 and database software 808.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and transparent secure interception handling processing 896.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

In one or more embodiments, the invention may be described by the following feature combinations.

In a first embodiment according to the present invention, a computer implemented method for transparent secure interception handling comprises deploying a virtual machine, VM, in an environment, the environment comprising a hypervisor running on a hardware and a firmware which manages the hardware and which manages states of the virtual machine, the virtual machine being configured to access a corresponding VM memory of the environment; upon deploying the virtual machine providing buffers by the hypervisor to the firmware; executing VM instructions of the virtual machine; intercepting by the firmware a VM instruction of the VM instructions which requires access to instruction data, the instruction data comprising at least one of: VM data that is stored in the VM memory and at least part of the state of the virtual machine, VM state; upon the intercepting of the VM instruction copying by the firmware the VM state into a shadow VM state buffer owned by the firmware; copying by the firmware the instruction data to the buffers; executing by the hypervisor the intercepted VM instruction using the buffers; before resuming execution of the VM instructions following the intercepted VM instruction updating at least one of the shadow VM state buffer and the VM data in the VM memory using result data in the buffers in case the executing of the intercepted VM instruction results in the result data; and resuming execution of the VM instructions following the intercepted VM instruction based on the state stored in the shadow VM state buffer.

In another aspect according to the first embodiment discussed above, the buffers comprise a VM state buffer and a memory pool. In another aspect according to the embodiment discussed above, copying the instruction data to the buffers comprises copying by the firmware the at least part of the VM state from the shadow VM state buffer to the VM state buffer; in case the instruction data comprises VM data that is stored in the VM memory copying by the firmware the VM data from the VM memory to the memory pool; and replacing by the firmware, in the VM state buffer, first addresses to data in the VM memory by corresponding second addresses in the memory pool.

In another aspect according to the first embodiment discussed above, updating at least one of the shadow VM state buffer and the VM data in VM memory comprises in response to determining that the result data comprises processed VM data in the memory pool copying by the firmware at least part of the processed VM data from the memory pool to associated addresses of the first addresses; copying by the firmware at least part of the result data stored in the VM state buffer to the shadow VM state buffer; replacing by the firmware in the shadow VM state buffer addresses of the second addresses by corresponding addresses to data in the VM memory.

In another aspect according to the first embodiment discussed above, the "at least part of the processed VM data" comprises expected data determined by the firmware using the intercepted VM instruction and arguments of the intercepted VM instruction.

In another aspect according to the first embodiment discussed above, and any of the aspects discussed above, the instruction data is determined by the firmware using the intercepted VM instruction and arguments of the intercepted VM instruction.

In another aspect according to the first embodiment discussed above, and any of the aspects discussed above, the method may further comprise upon deploying the virtual machine preventing the hypervisor to access the VM memory.

In another aspect according to the first embodiment discussed above, and any of the above discussed features, the method further comprises filling, by the firmware, unused data locations in the memory pool and the buffer for the VM state with fake data.

In another aspect according to the first embodiment discussed above, the fake data comprises at least one of random data and zeros.

In another aspect according to the first embodiment discussed above, and any of the above discussed features, the method further comprises executing by the hypervisor the intercepted VM instruction further comprising requesting by the hypervisor to resume the execution of the VM instructions following the intercepted VM instruction.

In another aspect according to the first embodiment discussed above, and any of the above discussed features, the method further comprises copying by the firmware the state of the virtual machine into the shadow VM state buffer owned by the firmware being performed upon setting up a virtual CPU, vCPU, for the virtual machine or upon executing the VM instructions on the vCPU.

What is claimed is:

1. A computer implemented method for transparent secure interception handling, comprising:
    deploying a virtual machine (VM) in an environment, the environment comprising a hypervisor running on a hardware and a firmware which manages the hardware and which manages a VM state, the virtual machine being configured to access a corresponding VM memory of the environment;
    providing a buffer by the hypervisor to the firmware, in response to deploying the virtual machine;

executing VM instructions of the virtual machine;

intercepting, by the firmware, a VM instruction of the VM instructions which requires access to instruction data, the instruction data comprising at least one of VM data that is stored in the VM memory and at least part of a state of the virtual machine;

upon the intercepting of the VM instruction, copying by the firmware, the VM state into a shadow VM state buffer owned by the firmware;

copying, by the firmware, the instruction data to the buffer;

executing, by the hypervisor, the intercepted VM instruction using the buffer;

updating at least part of the shadow VM state buffer and the VM data in the VM memory using result data in the buffer in response to the executing of the intercepted VM instruction resulting in the result data; and executing the VM instructions based on a state stored in the updated shadow VM state buffer, and following the intercepted VM instruction.

2. The method of claim 1, wherein the updating at least part of the shadow VM state buffer follows the VM instruction interception.

3. The method of claim 1, further comprising:
before resuming the execution of the VM instructions following the intercepted VM instruction, performing the updating at least part of the shadow VM state buffer and the VM data in the VM memory using result data in the buffer in response to the executing of the intercepted VM instruction, by the hypervisor, resulting in the result data; and
resuming the execution of the VM instructions following the intercepted VM instruction based on the state stored in the updated shadow VM state buffer.

4. The method of claim 1, further comprising:
interrupting the execution of the VM instructions;
before resuming the execution of the VM instructions after the interruption performing the updating at least part of the shadow VM state buffer state buffer and the VM data in the VM memory using result data in the buffer in response to the executing of the interrupt handler by the hypervisor; and
resuming the execution of the VM instructions following the based on the state stored in the updated shadow VM state buffer.

5. The method of claim 1, wherein the buffer comprises a VM state buffer and a memory pool.

6. The method of claim 5, wherein the copying the instruction data to the buffer comprises:

copying, by the firmware, at least part of the VM state from the shadow VM state buffer to the VM state buffer;

copying, by the firmware, the VM data from the VM memory to the memory pool in response to the instruction data comprising VM data stored in the VM memory; and replacing, by the firmware, in the VM state buffer, first addresses to data in the VM memory by corresponding second addresses in the memory pool.

7. The method of claim 6, wherein updating at least part of the shadow VM state buffer and the VM data in VM memory comprises:
in response to determining that the result data comprises processed VM data in the memory pool, copying by the firmware at least part of the processed VM data from the memory pool to associated addresses of the first addresses;
copying by the firmware at least part of the result data stored in the VM state buffer to the shadow VM state buffer; and
replacing by the firmware in the shadow VM state buffer addresses of the second addresses by corresponding addresses to data in the VM memory.

8. The method of claim 7, wherein the at least part of the processed VM data comprises expected data determined by the firmware using the intercepted VM instruction and arguments of the intercepted VM instruction.

9. The method of claim 6, further comprising: filling by a firmware unused data locations in the memory pool and the buffer for the VM state with fake data.

10. The method of claim 9, wherein the fake data comprises at least one of random data and zeros.

11. The method of claim 1 wherein the instruction data is determined by the firmware using the intercepted VM instruction and arguments of the intercepted VM instruction.

12. The method of claim 1, further comprising upon deploying the virtual machine preventing the hypervisor to access the VM memory.

13. The method of claim 1, executing by the hypervisor the intercepted VM instruction further comprising requesting by the hypervisor to resume the execution of the VM instructions following the intercepted VM instruction.

14. The method of claim 1, copying by the firmware the state of the virtual machine into the shadow VM state buffer owned by the firmware being performed upon setting up a virtual CPU, vCPU, for the virtual machine or upon executing the VM instructions on the vCPU.

* * * * *